US012491610B2

(12) United States Patent
Friis et al.

(10) Patent No.: US 12,491,610 B2
(45) Date of Patent: Dec. 9, 2025

(54) FASTENER SETTING TOOL

(71) Applicant: Illinois Tool Works Inc., Glenview, IL (US)

(72) Inventors: Morten Friis, Middelfart (DK); Anders Nissen, Middelfart (DK)

(73) Assignee: Illinois Tool Works Inc., Glenview, IL (US)

( * ) Notice: Subject to any disclaimer, the term of this patent is extended or adjusted under 35 U.S.C. 154(b) by 254 days.

(21) Appl. No.: 17/458,693

(22) Filed: Aug. 27, 2021

(65) Prior Publication Data

US 2022/0072687 A1 Mar. 10, 2022

(30) Foreign Application Priority Data

Sep. 9, 2020 (EP) ...................................... 20195370
Oct. 2, 2020 (EP) ...................................... 20199800
Nov. 10, 2020 (EP) ...................................... 20206810

(51) Int. Cl.
*B25B 23/08* (2006.01)
*B25B 23/00* (2006.01)

(52) U.S. Cl.
CPC ............ *B25B 23/08* (2013.01); *B25B 23/005* (2013.01)

(58) Field of Classification Search
CPC ......... B25B 5/068; B25B 5/102; B25B 5/127; B25B 21/00; B25B 21/002; B25B 23/005;
(Continued)

(56) References Cited

U.S. PATENT DOCUMENTS 1,074,800 A 10/1913 King
4,850,114 A * 7/1989 Vockins .............. E04F 21/0092
33/645
(Continued)

FOREIGN PATENT DOCUMENTS

CN 105936028 A * 9/2016 ............. B25B 5/163
CN 208322760 U * 1/2019
(Continued)

OTHER PUBLICATIONS

Translation of CN 208322760 U (Year: 2019).*
(Continued)

*Primary Examiner* — David S Posigian
*Assistant Examiner* — Steven Huang
(74) *Attorney, Agent, or Firm* — Neal, Gerber & Eisenberg LLP

(57) ABSTRACT

A fastener setting tool for installing a fastener into a board structure, comprising a tool body having a bottom surface and a longitudinal axis; a spacer assembly, comprising a first abutment member, having a first engagement surface, and a second abutment member, having a second engagement surface opposingly spaced apart from said first engagement surface, each one of said first and second abutment member extending away from and in a direction normal to said bottom surface of said tool body, said spacer assembly being configured to cooperatingly positioningly engage the board structure; at least one fastener guide operably coupled to any one of said first and second abutment member, and configured to guidingly receive a fastener for the board structure; and a spacer adjustment mechanism, adapted to selectively lockingly move at least one of said first and second abutment member in a direction along said longitudinal axis.

20 Claims, 8 Drawing Sheets

(a)

(b) (c)

(58) Field of Classification Search
CPC ....... B25B 23/02; B25B 23/04; B25B 23/045;
B25B 23/06; B25B 23/065; B25B 23/08;
B25B 23/10; B25B 31/00; B25B 31/005;
Y10T 408/569; Y10T 408/50; Y10T
408/567; Y10T 408/568; Y10T 29/5343;
Y10T 29/5347; Y10T 408/56245; B23B
49/023; B23B 49/02; B23B 47/28; B23B
47/287; B23B 2247/10; B23B 2247/12;
B23B 2260/004; B23B 2260/088; E04F
21/22; B25C 3/002; B25C 3/006; B23P
19/006; B23P 19/02; B23P 19/06; B25G
1/06; B26B 5/003; B26B 1/08
USPC ........................................ 269/6, 42; 408/103
See application file for complete search history.

(56) References Cited

U.S. PATENT DOCUMENTS

| | | | |
|---|---|---|---|
| 4,930,225 A | 6/1990 | Phillips | |
| 6,935,628 B1* | 8/2005 | Conversa | B25B 5/163 269/166 |
| D516,400 S | 3/2006 | Yang | |
| 7,094,008 B2 | 8/2006 | Hartsfield | |
| D553,931 S | 10/2007 | Buck | |
| D591,131 S | 4/2009 | Buck | |
| D600,085 S | 9/2009 | Mandel et al. | |
| 8,572,852 B1* | 11/2013 | Jennings | B26B 5/003 30/162 |
| D704,018 S | 5/2014 | Vandenberg | |
| 9,120,214 B2 | 9/2015 | Vandenberg | |
| 10,307,898 B2 | 6/2019 | Lin | |
| 10,427,279 B2 | 10/2019 | Rensburg | |
| D901,274 S | 11/2020 | Kirkpatrick et al. | |
| D956,502 S | 7/2022 | Yang et al. | |
| D958,625 S | 7/2022 | Yang et al. | |
| 2007/0175176 A1* | 8/2007 | Lane | B23B 49/005 52/749.1 |
| 2008/0187404 A1* | 8/2008 | Chiang | B23B 47/287 408/115 R |
| 2009/0053003 A1* | 2/2009 | Clark | B23B 47/287 408/103 |
| 2010/0083610 A1 | 4/2010 | King | |
| 2011/0167757 A1 | 7/2011 | Vandenberg | |
| 2011/0170984 A1 | 7/2011 | Vandenberg | |
| 2012/0204409 A1* | 8/2012 | Vandenberg | F16B 25/0073 29/271 |
| 2013/0276589 A1 | 10/2013 | Vandenberg | |
| 2013/0306633 A1* | 11/2013 | Belinda | B25H 7/00 33/562 |
| 2015/0321325 A1 | 11/2015 | Vandenberg | |
| 2017/0297119 A1* | 10/2017 | Chang | B23B 47/287 |
| 2017/0320198 A1 | 11/2017 | Vandenberg | |
| 2018/0161966 A1* | 6/2018 | Rensburg | B25B 5/003 |
| 2018/0361546 A1* | 12/2018 | Mikkelsen | E04F 21/22 |
| 2019/0168367 A1 | 6/2019 | Largo et al. | |
| 2020/0011073 A1 | 1/2020 | Sheppard et al. | |
| 2020/0215669 A1* | 7/2020 | Lin | B25B 23/005 |
| 2022/0072687 A1 | 3/2022 | Friis et al. | |

FOREIGN PATENT DOCUMENTS

| | | | | |
|---|---|---|---|---|
| CN | 111660242 A | * | 9/2020 | ............ B25C 3/006 |
| DE | 202010000256 U1 | * | 10/2011 | ............ B25B 5/068 |
| DE | 10 2016 014860 | | 3/2018 | |
| EP | 1932623 A1 | | 6/2008 | |
| EP | 2517834 B1 | | 1/2018 | |
| EP | 3064321 B1 | | 1/2018 | |
| EP | 3416782 A2 | | 12/2018 | |
| GB | 2588174 A | * | 4/2021 | ............ E04F 21/22 |
| TW | 546164 B | | 8/2016 | |
| WO | WO-2015013738 A1 | * | 2/2015 | ............ B23B 49/02 |
| WO | 2019036146 A1 | | 2/2019 | |
| WO | 2019173007 A1 | | 9/2019 | |
| WO | WO-2023163628 A1 | * | 8/2023 | |

OTHER PUBLICATIONS

Translation of DE 202010000256 U1 (Year: 2011).*
Translation of CN 105936028 A (Year: 2016).*
Translation of CN 111660242 A (Year: 2020).*
Extended European Search Report for European Application No. 20206810.2, dated Apr. 7, 2021 (8 pages).
Pictures of Products available prior to Sep. 9, 2020.
European Examination Report for European Application No. 20206810.2, mailed Aug. 7, 2024 (5 pages).
European Office Action for European Application No. 20206810.2, mailed Apr. 1, 2025 (6 pages).

* cited by examiner

FASTENER SETTING TOOL

PRIORITY

This application claims priority to and the benefit of European Patent Application No. 20206810.2, filed Nov. 10, 2020, European Patent Application No. 20199800.2, filed Oct. 2, 2020, and European Patent Application No. 20195370.0, filed Sep. 9, 2020, the entire contents of which are incorporated herein by reference.

The present disclosure relates to a fastener setting tool, in particular, but not exclusively, to a fastener setting tool for installing fasteners into board structures and a method of using the fastener setting tool. Even more particularly, the present disclosure relates to a fastener setting tool, for a construction board, that has an improved width adjustment mechanism to accommodate the installation of fasteners into construction boards of a wider range of widths.

BACKGROUND

It is generally known that fasteners, such as threaded screws, can be used to fasten a workpiece, such as a decking board or another construction board, to a substrate such as a deck. Typically, these fasteners are advanced into the workpiece vertically downwards into the workpiece and into the substrate. Though, one of the drawbacks of vertically driven fasteners is that the heads of the fastener remain visible to the user when installed into the workpiece.

In order to conceal the heads of screws, various tools have been developed that can be mounted onto a workpiece, so as to hold the workpiece into position and provide a predetermined spacing between adjacent workpieces (e.g., decking boards). In particular, such tools facilitate the installation by guiding fasteners in a direction that is angled with respect to the vertical axis. Typically, these tools include a body that is held in place on top of the workpiece by a set of cooperating clamping members spaced apart so as to cover the width of the decking board. The body usually comprises guide bores angularly positioned towards the workpiece so that the fastener can be installed through the guide bore at a predetermined angle. Some tools may include cooperating clamping members that are adjustable to a limited range of different widths. However, currently known tools use a relatively complicated and cumbersome adjustment mechanism to move at least one of the clamping members so as to provide for different widths. Further, the relatively complex mechanism used with these tools only allows for a very limited range of widths and may be rendered inoperable easily from dust or debris.

Consequently, it would be desirable to provide a fastener setting tool that can alleviate or mitigate one or more of the aforementioned problems. Particularly, the present disclosure provides a fastener setting tool with a width adjustment mechanism that can provide a wider range of widths, and that is simpler and more robust than currently known tools.

The present disclosure provides at least an alternative to fastener setting tools of the prior art.

SUMMARY

In accordance with a first embodiment of the present disclosure there is provided a fastener setting tool according to the appended claims.

According to an aspect of the present disclosure, there is provided a fastener setting tool, comprising:

a tool body having a bottom surface and a longitudinal axis;

a spacer assembly, comprising a first abutment member, having a first engagement surface, and a second abutment member, having a second engagement surface opposingly spaced apart from the first engagement surface, each one of the first and second abutment member extending away from and in a direction normal to the bottom surface of the tool body, the spacer assembly being configured to cooperatingly positioningly engage the board structure;

at least one fastener guide operably coupled to any one of the first and second abutment member, and configured to guidingly receive a fastener for the board structure; and a spacer adjustment mechanism, adapted to selectively lockingly move at least one of the first and second abutment member in a direction along the longitudinal axis.

Thus, the fastener setting tool is adjustable to engage board structures of a wider range of different sizes, such that the same fastener setting tool can be used to install a fastener into differently sized board structures (i.e., a range of different board widths). At least one of the first and second abutment member are moveable into contactingly engage with the board structure such that the fastener guide is always positioned to allow a fastener to be inserted into the board structure correctly.

Advantageously, in some embodiments, the spacer adjustment mechanism comprises a guideway formed in the tool body along said longitudinal axis, comprising a plurality of locking teeth operably spaced along the guideway. By providing a guideway with locking teeth, the abutment members can be moved and locked in predetermined positions defined by the equidistantly spaced locking teeth. The locking teeth may, for example, be positioned such that the spacing between the abutment members at those portions correspond to common sizes of board structures.

Advantageously, in some embodiments, the fastener setting tool further comprises a slider, configured to selectively lockingly engage with the locking teeth. In some embodiments, the slider is arranged on the exterior of the tool body and operably coupled to one of the first and second abutment member. By providing a slider in this way, the slider is readily engageable to move the slider along the guideway, and therefore move one of the abutment members along the longitudinal axis of the tool body into a desired position.

Advantageously, in some specific embodiments, the slider is movable between an engaged position, in which the slider is lockingly engage with the locking teeth, and a disengaged position, in which the slider is disengaged from the locking teeth. This is particularly advantageous, because the slider can be disengaged from the locking teeth to move the slider along the guideway. When the position is to be locked in place, the slider can once again be engaged with the locking teeth. The position of the abutment members is therefore selectively lockable. This is beneficial because the position of the abutment members cannot be unintentionally changed during, for example, installation of a fastener.

Advantageously, in some embodiments, the slider is resiliently biased towards the engaged position. Therefore, the slider is, by default, engaged with the locking teeth, only disengaged from the locking teeth when the position of the abutment member(s) is to be changed.

Advantageously, in some embodiments, the locking teeth are equidistantly spaced along the guideway.

Advantageously, in some embodiments, the guideway comprises a lower guide surface and an upper guide surface, each one comprising a plurality of locking teeth arranged complementary opposite to one another. The lower and upper guide surfaces cooperate so as to engage the slider in a predetermined position. By having the lower guide and upper guide surfaces in this way, the predetermined positions, in which the slider is to be locked, are more readily defined. That is, a defined space is provided between each locking portion, to receive the slider.

Advantageously, in some embodiments, the tool body comprises a gauge configured to visually indicate the distance between the first abutment member and the second abutment member.

Advantageously, in some embodiments, the fastener setting tool further comprises a grip on an upper surface of the tool body, and a handle aligned with the grip on an opposite side away from the tool body.

Advantageously, in some embodiments, at least one of the first and second abutment member comprises a spring-loaded mechanism configured to bias at least one of said first and second abutment member towards each other.

Advantageously, in some embodiments, the grip is configured to actuate the spring-loaded mechanism so as to selectively temporarily move the first and second abutment member away from each other. This provides the advantage of that the tool can more easily placed onto the board before the abutment member clampingly engage with the board.

Advantageously, in some embodiments, at least one of the first abutment member and the second abutment member comprises a planar spacing member removably coupleable to said at least one of said first abutment member and said second abutment member.

The thickness of the abutment members can be changed such that the size of the gap between adjacent board structures can be modified.

According to another aspect of the present disclosure, there is provided a method of using a fastener setting tool, comprising the steps of:
(i) providing a fastener setting tool according to the first embodiment of the present disclosure;
(ii) moving at least one of the first and second abutment member into a predetermined position along the longitudinal axis;
(iii) placing the fastener setting tool on a board structure such that the board structure is positioned between the first abutment member and said second abutment member; and
(iv) inserting a fastener into the board structure before moving the tool onto the next board.

BRIEF DESCRIPTION OF DRAWINGS

Embodiments of the present disclosure are now described, by way of example only, hereinafter with reference to the accompanying drawings, in which:

FIG. 1 illustrates a fastener setting tool according to an embodiment of the present disclosure in (a) left-side view, (b) front-view and (c) rear-view;

FIG. 2 illustrates the fastener setting tool of FIG. 1 in (a) right-side view, (b) bottom-view and (c) top-view;

FIG. 3 illustrates different perspective views of the fastener setting tool of FIG. 1 in (a) top-left view (b) bottom-front view and (c) bottom-rear view;

FIG. 4 illustrates the main body portion of an embodiment of the fastener setting tool in (a) rear-right view and (b) side-view;

FIG. 5 illustrates (a) a close-up side-view of the first abutment member and attached spacer of an embodiment of the fastener setting tool, and (b) a set of spacers and countersunk screws, as well as, a tool (such as an Allen key) for installing the spacers to the abutment member of the fastener setting tool;

FIG. 7 illustrates a schematic illustration of the moving components of the fastening setting tool and inserted tool bit in (a) perspective view, (b) left-side view and (c) front-view; and FIG. 8 illustrates a cross-sectional close-up view of (a) a decking screw installed into a decking board at a predetermined angle and (b) a fastener setting tool with inserted tool bit engaging a decking screw to be inserted into a decking board and decking frame.

DETAILED DESCRIPTION

The described example embodiment relates to a fastener installation tool and particularly to a fastener installation tool used to install a fastener into decking boards. However, the present disclosure is not necessarily restricted to a fastener installation tool for installation a fastener into a decking boards but may also be used to install a fastener into a different installation surface.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

Figure 1:
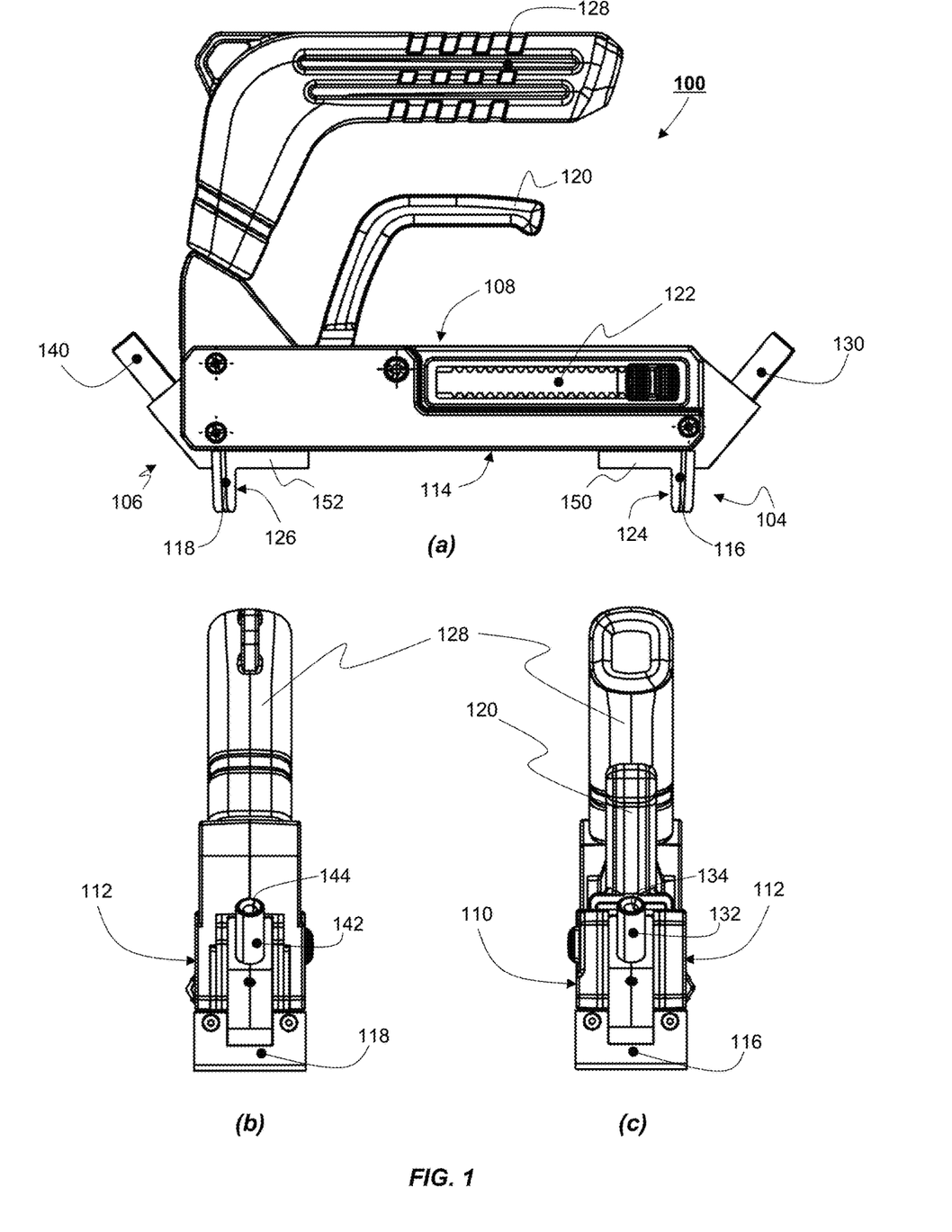

Referring now to FIG. 1, there is shown a fastener setting tool 100. The setting tool 100 has a main body 102 having a generally elongate shape extending along a longitudinal axis between a proximal end 104 and a distal end 106. As used throughout, the term "proximal" is used to describe the side of the fastener setting tool 100 that is closer to the user during operation, wherein the term "distal" is used to describe the side of the fastener setting tool 100 that is further away from the user during operation. In this example embodiment, the main body 102 is of cuboid shape having an upper surface 108, left and right side surfaces 110 and 112, and a bottom surface 114.

A pair of first and second abutment members 116 and 118 extend away from the bottom surface 114 and are operably coupled to a respective width adjustment mechanism 122, as well as, clamp handle 120, together forming a spacer assembly. The first abutment member 116 and the second abutment member 118 are arranged so as to be spaced apart from one another along a longitudinal axis of the bottom surface 114. More specifically, a first engagement surface 124 of the first abutment member 116 is opposingly spaced away from a second engagement surface 126 of the second abutment member 118. In this particular example embodiment, the first abutment member 116 is provided at the proximal end 104 and the second abutment member 118 is provided at the distal end 106 of the body 102.

The clamp handle 120 protrudes from the upper surface 108 of the main body 102 and is preferably arranged axially (such as vertically) in line with a main handle 128. In this particular example embodiment, the clamp handle 120 is adapted to move between a first position (biased towards the upper surface 108 of the main body 102), and a second position, pulled towards the main handle 128. Further, the clamp handle 120 is operably coupled to the second abutment member 118 (via a suitable clamp mechanism) such that the second abutment member 118 is pivoted away from the first abutment member 116 when the clamp handle 120 is moved towards the second position, thus, (slightly) increasing the distance between the first and second engagement surfaces 124 and 126. The clamp handle 120 is spring biased towards the first position, so once released, it will automatically move back into the first position. Suitable clamping mechanism are well known in the art and are therefore not described in any more detail. Further, it is understood by the person skilled in the art that the tool 100 of the present disclosure may not comprise such a biased clamp mechanism without departing from the scope of the present disclosure.

Figure 2:
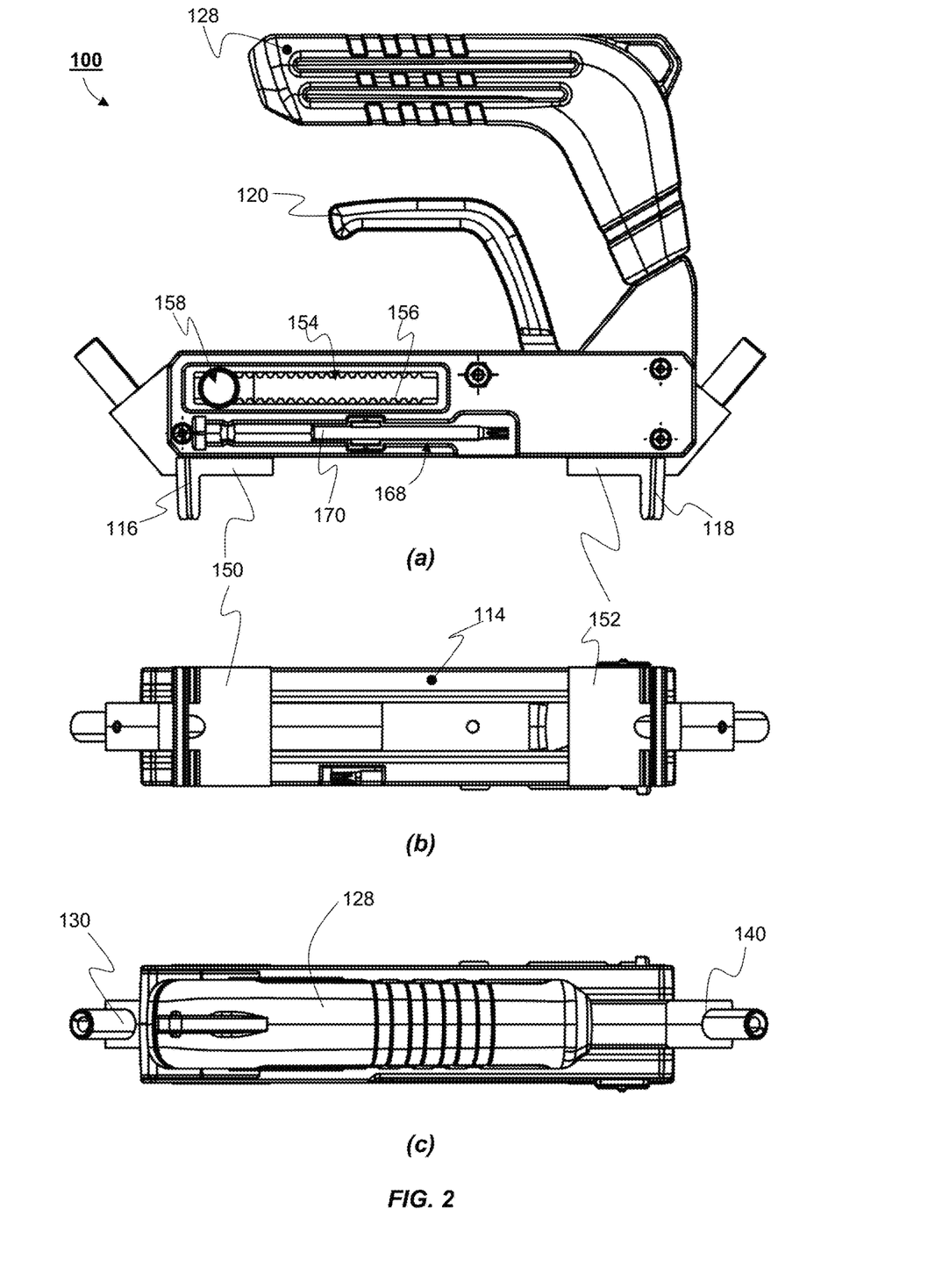

As particularly shown in FIGS. 1(a) and 2(a), the main handle 128 extends from the upper surface 108 at the distal end 106 upwards and angled backwards towards the proximal end 104 of the main body 102 and is substantially complementary shaped to the clamp handle 120.

Figure 3:
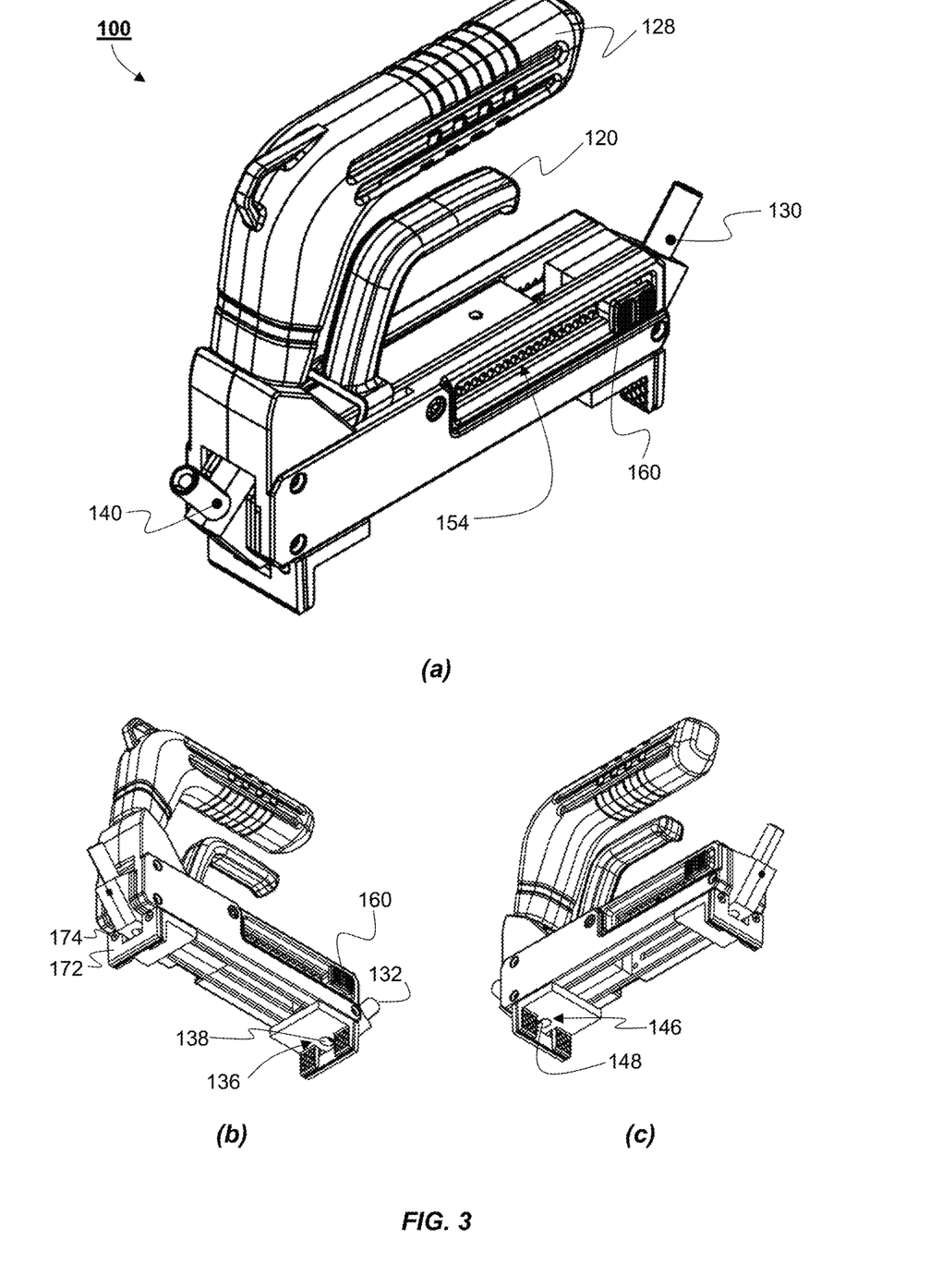

A first fastener guide 130 is located at the proximal end 104 of the tool body 102. The first fastener guide 130 has a first end portion 132 defining a first opening 134 (see FIG. 1(c)). Further, the first fastener guide 130 has a second end portion 136 at the opposing end of the first end portion 132 defining a second opening 138. A first through-bore extends between the first and second openings 134, 138 at a predetermined angle with respect to the bottom surface 114 (see FIGS. 1, 2, and 3, as well as, FIG. 8(b)). The first fastener guide 130 is operably coupled to the first abutment member 116 (such as being an integral part of the abutment member 116).

A second fastener guide 140 is located at the distal end 106 of the tool body 102. The second fastener guide 140 has a first end portion 142 defining a first opening 144. Further, the second fastener guide 140 has a second end portion 146 at the opposing end of the first end portion 142 defining a second opening 148 (see FIG. 3(c)). A second through-bore extends between the first and second openings 144 and 148 at a predetermined angle with respect to the bottom surface 114. In this particular example embodiment, the angle of the first through-bore is the same as the able of the second through-bore and may be in the region of 45 degrees with respect to a bottom surface plane. However, it is envisaged that any one of the first and second through-bore may have any other suitable angle with respect to the bottom surface plane. Also, alternatively, the angle of any one of the first and second fastener guides 130 and 140 (through-bores) may be adjustable via a suitable mechanism operably coupling first and second fastener guides 130 and 140 to respective first and second abutment members 116 and 118.

As best shown in FIGS. 1(a), 2(a), and 3(a), first and second abutment members 116 and 118 may have a respective first and second vertical spacing portion 150, 152, each one extending towards respective distal and proximal end 106, 104 in a direction parallel to the bottom surface 114. The first and second vertical spacing portions 150 and 152 are adapted to prevent a board structure to directly contact the bottom surface 114 of the fastener setting tool 100, during use.

Referring now to FIGS. 1(a), 2(a), and 3(a)-(c), the width adjustment mechanism 122 is operably coupled with the first abutment member 116 and comprises a guideway 154 formed within at least one side surface 110 and 112 of the tool body 102. In this particular example embodiment, respective guideways 154 are formed symmetrically within the left- and right-side surfaces 110 and 112 extending from the proximal end 104 approximately halfway towards the distal end 106. A plurality of detents 156 or locking teeth are arranged equidistantly on the upper and mirroringly (with respect to a central longitudinal axis of the guideway 154) on the lower longitudinal edge of the guideway 154, so as to provide opposing grooves along the guideway 154. A slider assembly 158 is operably arranged within the guideways 154 and coupled to the first fastener guide 130/abutment member 116. The slider assembly 158 (and coupled fastener guide 130 and abutment member 116) is selectively moveable between a locked position, where the slider assembly 158 is lockingly engaged with a respective pair of upper and lower detents 156 (of both guideways 154), and an unlocked position, where the slider assembly 158 is pushed out of engagement with any of the upper and lower detents 156 and movable (together with the first fastener guide 130 and first abutment member 116) along the guideways 154. The slider assembly 158 comprises a slider actuator 160 that biases the slider assembly 158 towards the locked position. Thus, in order to move the first abutment member 116 within the confines of the guideways 154, the slider actuator 160 provided on one side (in this example on the left-side surface 110) of the slider assembly 158 is simply pushed inwards moving respective locking portions (not shown) of the slider assembly 158 out of engagement with the detents 156. A slider catch 162 is provided on the other side (in this example on the right-side surface 112) of the slider assembly 158. The slider catch 162 is configured to move synchronously with the slider actuator 160 in and out of engagement with respective detents 156. However, it is understood by the person skilled in the art that the slider assembly 158 may comprise a slider actuator 160 on both guideways 154, (particularly, the guideway 154 of the left-side surface 110 and the guideway 154 of the right-side surface 112), so that the user may selectively release and lock the slider assembly 158 from any side of the tool 100.

Slider locking mechanisms, such as the one described for this particular example embodiment, are well known in the art (such as for utility knives) and are therefore not described in any more detail. Also, it is understood that any other suitable slider locking mechanism may be used to selectively move and lock any one of the first and/or second abutment member 116 into a plurality of predetermined positions. For example, in an alternative embodiment, lock and release of the slider assembly 158 within the guideway (s) 154 may be provided by a simple screw clamp mechanism (also well known in the art).

Further, in another alternative embodiment, the width adjustment mechanism 122 may only comprise a guideway 154 at one of the two side surfaces 110 and 112.

Figure 4:
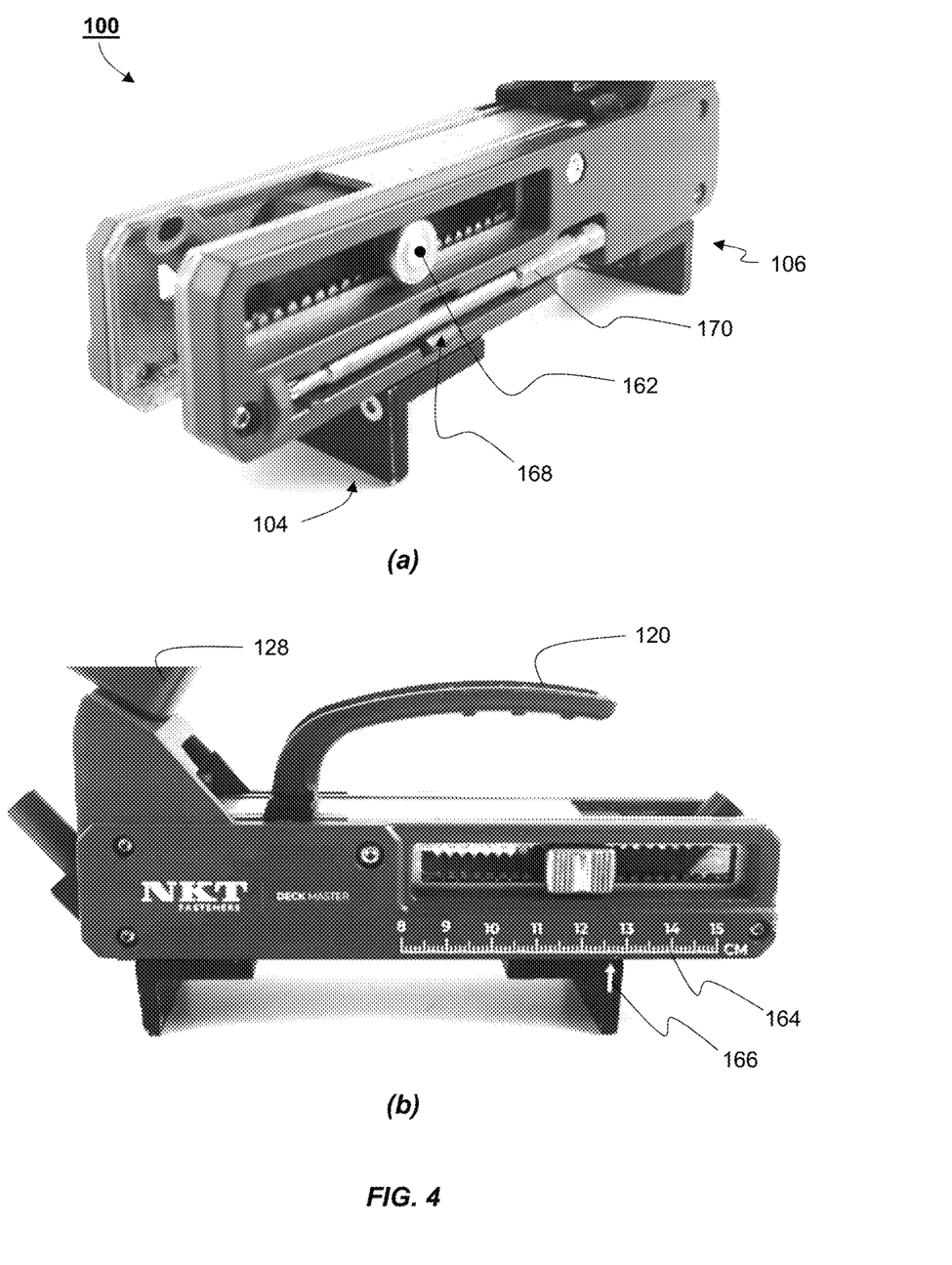

Referring now to FIGS. 4(a) and (b), the tool 100 of the present example embodiment comprises a scale 164 that is provided in line with at least one guideway 154 of the width adjustment mechanism 122. The scale 164 may be removably attached to one or both side surface(s) 110 and 112, so that is can be replaced, if, for example, used in countries with a different measurement system (e.g., UK—imperial, Germany—metric etc). The scale may be magnetically attached (e.g., into a matchingly shaped depression within the side surface 110 and 112), fastened via screws or clips. The scale 164 is arranged, so as to indicate the width between the first and second abutment member 116 and 118, and in particular, between the first and second engagement surfaces 124 and 126. A suitable arrow 166 may be provided at the movable first abutment member 116.

In addition, the tool 100 of the present example embodiment comprises a bit holder 168, for example, incorporated into one of the side surfaces 110 and 112 of the main body 102. The bit holder 168 is adapted to retainingly store a (tool) bit 170 when not used for installing deck screws. Any suitable retaining mechanism (e.g., a spring clamp or a magnet) may be used to securely but removably mount the bit 170 into the bit holder 168.

Figure 5:
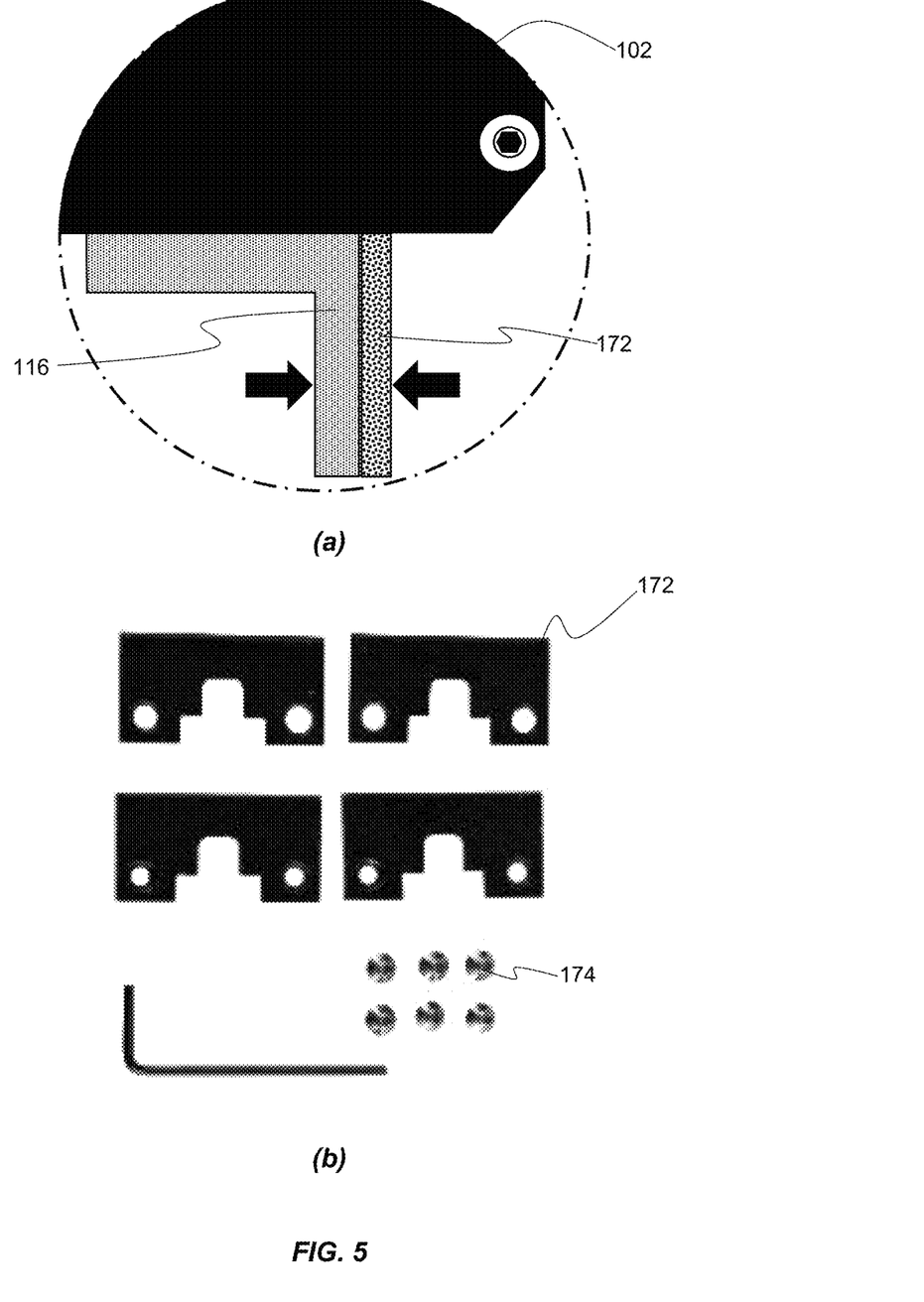

Referring now to FIG. 5 (a) in particular, each one of the first and second abutment members 116 and 118 has a fixed predetermined thickness, which is the minimum spacing obtainable between decking boards, during installation. In this particular example, the minimum spacing may be 3.0 mm. In order to provide for different spacings between the decking boards 200, the tool 100 is provided with additional spacers 172 that are attachable (e.g., via countersunk screws 174) to first and second engagement surfaces 124 and 126 of respective first and second abutment members 116 and 118. Spacers 172 of different thicknesses may be provided so as to add to the minimum thickness of the abutment member 116 and 118. For example, spacers 172 may be provided in thicknesses of 1.5 mm and 3.0 mm, allowing combined thicknesses of 4.5 mm or 6.0 mm, respectively. Also, various spacers 172 may be combined so as to add to the existing thickness of the abutment member 116 and 118, (e.g. first spacer (3.0 mm) plus second spacer (1.5 mm)) plus the minimum thickness of the abutment member (3.0 mm) giving a total board spacing of 7.5 mm. Any other combination of different or equal spacers 172 may be used to achieve a desired board spacing.

Figure 6:
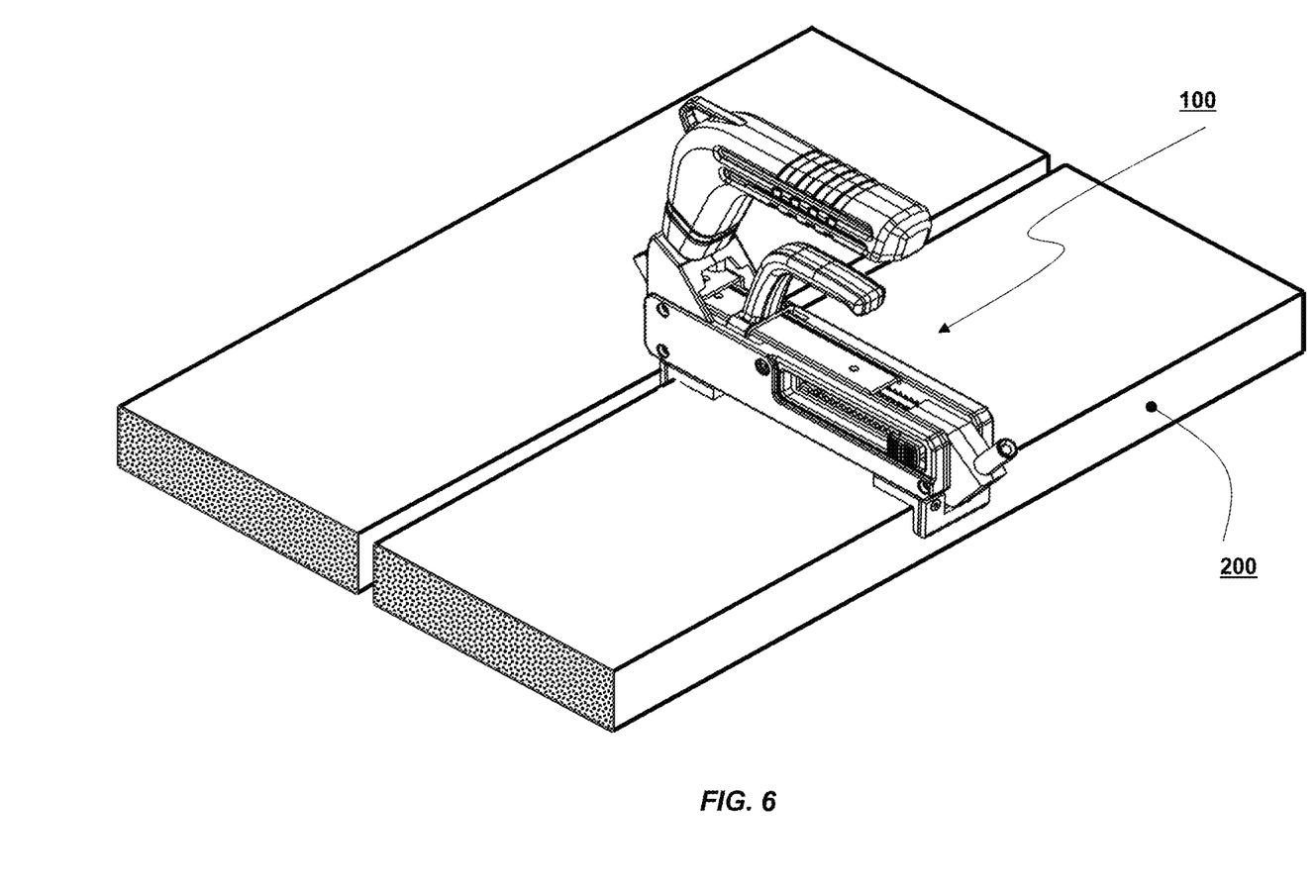
FIG. 6 illustrates a perspective view of the fastener setting tool of FIG. 1 when "clamped" onto a decking board, during use.
Figure 7:
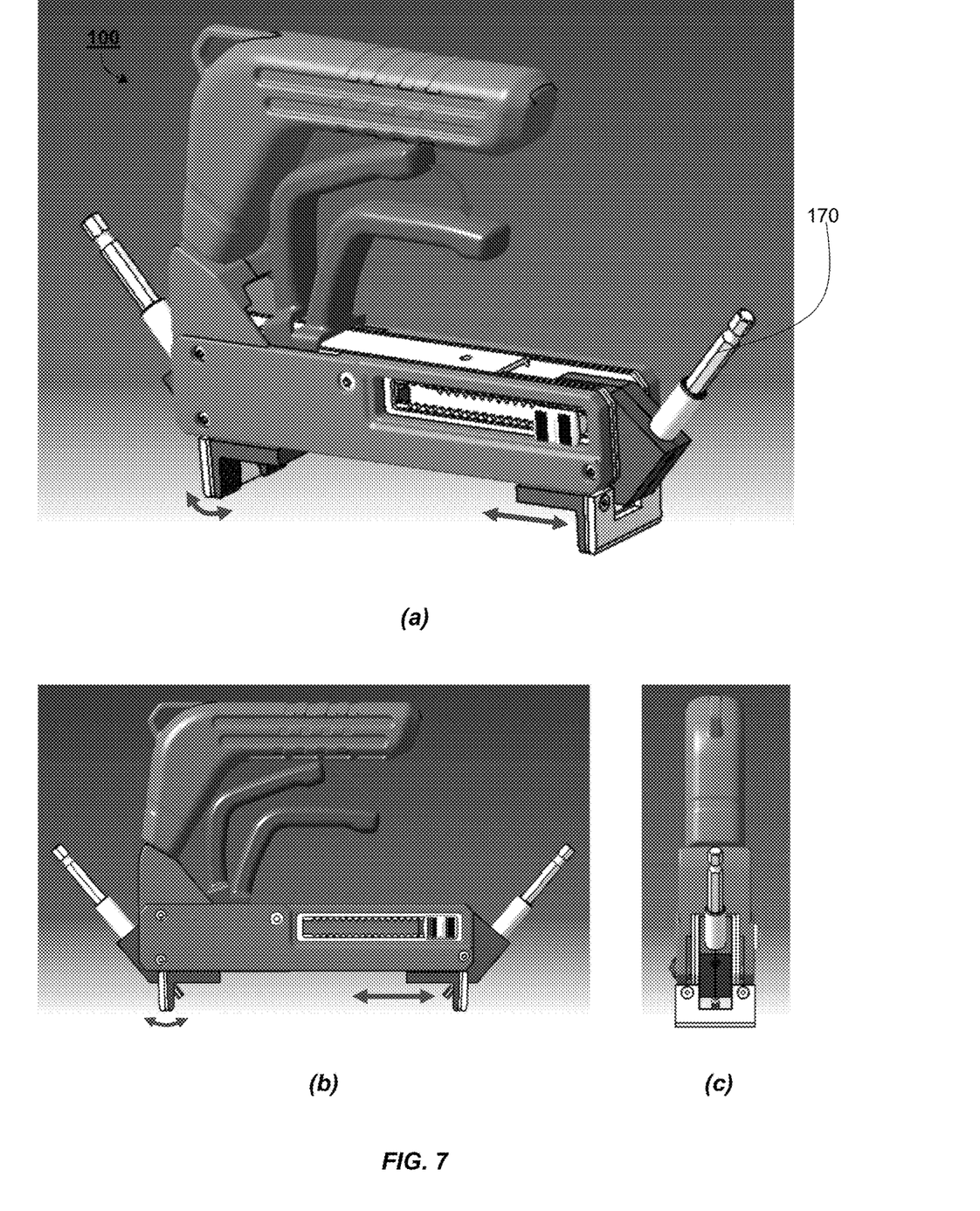
Figure 8:
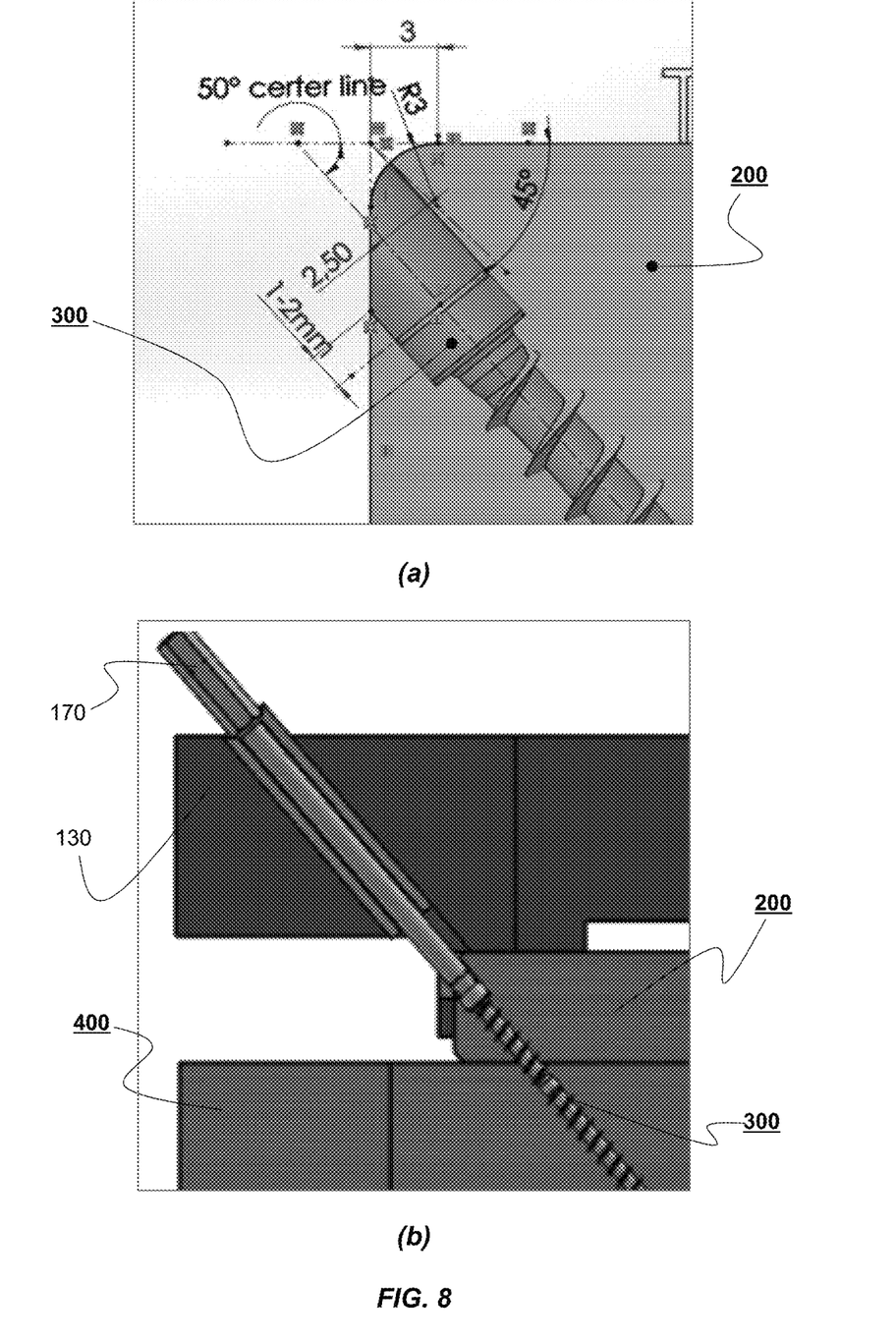

The function of the fastener setting tool 100 will now be described with particular reference to FIGS. 6, 7, and 8.

When used with a particular set of decking boards 200, the user first adjusts the tool 100 to the correct width of that decking board 200 by simply placing the tool 100 onto the decking board 200 and moving the first abutment member 116 into engagement with the side surface of the decking board 200, so that both, first and second engagement surfaces 124 and 126 touch respective side surfaces of the decking board 200. To move the first abutment member 116, the user simply pushes the slider actuator 160 in, releasing the slider assembly 158 from locking engagement with the detents 156 and then moves the slider assembly 158 and first abutment member 116 (as well as first fastener guide 130) along the guideway 154 into a desired position. The slider actuator 160 is then released and the slider assembly 158 is automatically biased back into locking engagement with respective detents 156. The tool 100 is now set up for a decking board 200 of a particular width.

When fixing the decking boards 200 to a decking frame 400 (see FIG. 8), the user grabs the main handle 128 and squeezes the clamp handle 120, thus, increasing the spacing between the first and second engagement surfaces 124 and 126 (i.e., pivoting the second abutment member 118 away from the first abutment member 116) and allowing the first and second abutment members 116 and 118 to be placed over the decking board 200. When the clamp handle 120 is released, the spring biased second abutment member 118 automatically moves back into its start position, providing a "clamping" pressure and fixating the tool 100 onto the board 200 for an accurate installation of a decking screw 300 (see FIG. 8).

When the tool 100 is readily fixated onto the board 200, the deck screw 300 is inserted into the respective fastener guide 130 or 140 (depending on the position of the tool 100 on the board 200) followed by a suitable tool bit 170 (attached to a power tool or hand tool) to engage with the screw head and rotatingly move the screw 300 into the decking board 200 at the predetermined angle of the respective fastener guide 130 or 140. The shape or inner profile of the respective fastener guide 130 or 140 and associated tool bit 170 has been configured and optimised so that the bit 170 automatically moves out of engagement with the screw head when the deck screw 300 is at a predetermined depth within the decking board 200 and decking frame 400 (e.g., a shoulder portion of the bit 170 abuttingly engages with the respective first end portion 132 or 142 of any one of the first and second fastener guides 130 and 140).

After the deck screw 400 has been inserted into the board 200 and frame 400 and the tool bit 170 (and attached power or hand tool) has been removed, the tool 100 is simply released from the board 200 by squeezing the clamp handle 120 to then be moved into its next position on this or another decking board 200.

In the event the user wishes to increase the minimum board spacing provided by the first and second abutment members 116 and 118, one or more spacers 172 of a predetermined thickness may be attached to first and/or second engagement surfaces 124 and 126 utilising countersunk screws 174.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract or drawings), or to any novel one, or any novel combination, of the steps of any method or process so disclosed.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:

1. A fastener setting tool for installing a fastener into a board structure, the fastener setting tool comprising:
   a tool body having a flat bottom surface extending from at least a first abutment member to a second abutment member and a longitudinal axis;
   a handle connected to the tool body and extending above an upper surface of the tool body, wherein the flat bottom surface of the tool body is opposite the handle,
   a spacer assembly including:
     the first abutment member having a first engagement surface, and
     the second abutment member having a second engagement surface opposingly spaced apart from the first engagement surface,
     wherein the first and second abutment members each extends away from and in a direction normal to the bottom surface of the tool body,
     wherein the first and second abutment members are engageable with the board structure, and
     wherein the first abutment member has a first vertical spacing portion extending towards a first distal end and towards a first proximal end in a direction parallel to the bottom surface,
     wherein the second abutment member has a second vertical spacing portion extending towards a second distal end and proximal towards a second proximal end in a direction parallel to the bottom surface,
     wherein the first and second vertical spacing portions are configured to prevent the board structure from directly contacting the bottom surface;
   a fastener guide operably coupled to one of the first and second abutment members, and configured to guidingly receive a fastener for the board structure; and
   a spacer adjustment mechanism, at least one of the first and second abutment members selectively lockingly movable by the spacer adjustment mechanism in a direction along the longitudinal axis, wherein the spacer adjustment mechanism includes a guideway formed in the tool body along the longitudinal axis and extending a width of the tool body and at least halfway of the length of the tool body, the guideway including a lower guide surface and an upper guide surface, each guide surface including a plurality of locking teeth arranged complementary opposite to one another and operably spaced along the guideway, and a slider assembly disposed within the guideway, engageable with the teeth and resiliently biased towards an engaged position.

2. The fastener setting tool of claim 1, wherein the slider assembly includes a slider actuator that biases the slider assembly towards the engaged position.

3. The fastener setting tool of claim 1, wherein the flat bottom surface extends to substantially the length of the tool body.

4. The fastener setting tool of claim 3, wherein the slider assembly is arranged on an exterior of the tool body and operably coupled to one of the first and second abutment members.

5. The fastener setting tool of claim 1, wherein the slider assembly is movable between the engaged position in which the slider assembly is lockingly engaged with the locking teeth, and a disengaged position in which the slider assembly is disengaged from the locking teeth.

6. The fastener setting tool of claim 5, wherein the slider actuator is present on a side of the slider assembly.

7. The fastener setting tool of claim 6, wherein the slider actuator is configured to be pushed inwards towards the locking teeth of the guideway to disengage.

8. The fastener setting tool of claim 1, wherein the locking teeth are equidistantly spaced along the guideway.

9. The fastener setting tool of claim 1, wherein the tool body includes a gauge that visually indicates a distance between the first abutment member and the second abutment member.

10. The fastener setting tool of claim 9, wherein the first abutment members includes an arrow pointing to the gauge.

11. The fastener setting tool of claim 1, wherein the handle includes a grip.

12. The fastener setting tool of claim 11, wherein at least one of the first and second abutment members includes a spring loaded mechanism that biases one of the first and second abutment members toward the other of the first and second abutment members.

13. The fastener setting tool of claim 12, wherein the grip is configured to actuate the spring loaded mechanism, so as to selectively temporarily move the first and second abutment members away from each other by a predetermined distance.

14. A method of using the fastener setting tool of claim 1, the method comprising:
   (i) moving at least one of the first and second abutment members into a predetermined position along the longitudinal axis;
   (ii) placing the fastener setting tool on the board structure such that the board structure is positioned between the first and second abutment members; and
   (iii) inserting a fastener through the fastener guide into the board structure before moving the fastener setting tool onto a next board.

15. A fastener setting tool for installing a fastener into a board structure, the fastener setting tool comprising:
   a tool body having a flat bottom surface extending substantially a length of a longitudinal axis of the tool body, wherein the flat bottom surface is opposite a handle connected to the tool body and disposed above the tool body;
   a spacer assembly including a first abutment member having a first engagement surface and a second abutment member having a second engagement surface opposingly spaced apart from the first engagement surface, each one of the first and second abutment members extends away from and in a direction normal to the bottom surface of the tool body, the first and second abutment members engageable with the board structure;
   a first fastener guide operably coupled to the first abutment member and configured to guidingly receive a fastener for the board structure;
   a second fastener guide operably coupled to the second abutment member and configured to guidingly receive a fastener for the board structure; and a spacer adjustment mechanism, the first and second abutment members selectively lockingly movable by the spacer adjustment mechanism,
  wherein the spacer adjustment mechanism includes a guideway formed in the tool body from a proximal end of the tool body approximately halfway towards a distal end of the tool body along the longitudinal axis and extending a width of the tool body,
  wherein the guideway includes a lower guide surface and an upper guide surface,
  wherein each guide surface includes a plurality of locking teeth arranged complementary opposite to one another and operably spaced along the guideway, and
  wherein a slider assembly is disposed within the guideway, engageable with the teeth and resiliently biased towards an engaged position,
  wherein a slider actuator is positioned on one side of the guideway and configured to be pushed inward towards the locking teeth to disengage with the teeth, and
  wherein a slider catch is positioned on an opposite side of the guideway and configured to move synchronously with the slider actuator in and out of engagement with the teeth.

16. The fastener setting tool of claim 15, wherein the slider assembly comprises the slider actuator, the slider actuator biasing the slider assembly towards the engaged position.

17. The fastener setting tool of claim 16, wherein the slider assembly is movable between the engaged position in which the slider assembly is lockingly engaged with the locking teeth, and a disengaged position in which the slider assembly is disengaged from the locking teeth.

18. The fastener setting tool of claim 15, wherein the slider actuator is configured to be pushed inwards to disengage.

19. The fastener setting tool of claim 18, wherein at least one of the first and second abutment members includes a spring loaded mechanism that biases the at least one of said first and second abutment members towards each other.

20. The fastener setting tool of claim 19, which includes a grip configured to actuate the spring loaded mechanism, so as to selectively temporarily move the first and second abutment members away from each other by a predetermined distance.

* * * * *